US006696839B2

(12) United States Patent
Ellingsrud et al.

(10) Patent No.: US 6,696,839 B2
(45) Date of Patent: Feb. 24, 2004

(54) ELECTROMAGNETIC METHODS AND APPARATUS FOR DETERMINING THE CONTENT OF SUBTERRANEAN RESERVOIRS

(75) Inventors: Svein Ellingsrud, Trondheim (NO); Terje Eidesmo, Ranheim (NO); Harald Westerdahl, Dal (NO); Fan-Nian Kong, Oslo (NO)

(73) Assignee: Statoil ASA, Stavanger (NO)

( * ) Notice: Subject to any disclaimer, the term of this patent is extended or adjusted under 35 U.S.C. 154(b) by 0 days.

(21) Appl. No.: 10/214,377

(22) Filed: Aug. 7, 2002

(65) Prior Publication Data

US 2003/0048105 A1 Mar. 13, 2003

(51) Int. Cl.$^7$ ................................. G01V 3/08
(52) U.S. Cl. ........................... 324/337; 702/13
(58) Field of Search ................ 324/348, 337, 324/357, 354, 349, 350, 345, 360; 73/155; 702/7, 13; 343/719

(56) References Cited

U.S. PATENT DOCUMENTS

| | | | |
|---|---|---|---|
| 2,077,707 A | 4/1937 | Melton | 175/182 |
| 2,531,088 A | 11/1950 | Thompson | 175/182 |
| 3,052,836 A | 9/1962 | Postma | 324/1 |
| 3,806,795 A | 4/1974 | Morey | 324/6 |
| 4,010,413 A | 3/1977 | Daniel | 324/6 |
| 4,047,098 A | 9/1977 | Duroux | 324/6 |
| 4,079,309 A | 3/1978 | Seeley | 324/6 |
| 4,258,321 A | 3/1981 | Neale, Jr. | 324/334 |
| 4,258,322 A | 3/1981 | Rocroi et al. | 324/335 |
| 4,308,499 A | 12/1981 | Thierbach et al. | 324/337 |
| 4,417,210 A | 11/1983 | Rocroi et al. | 324/336 |
| 4,446,434 A | 5/1984 | Sternberg et al. | 324/363 |
| 4,506,225 A | 3/1985 | Loveless et al. | 324/334 |
| 4,616,184 A | 10/1986 | Lee et al. | 324/335 |
| 4,617,518 A | 10/1986 | Srnka | 324/365 |
| 4,633,182 A | 12/1986 | Dzwinel | 324/335 |

(List continued on next page.)

FOREIGN PATENT DOCUMENTS

| | | | | |
|---|---|---|---|---|
| EP | 0087271 | 8/1983 | | G01V/3/10 |
| EP | 0512756 | 11/1991 | | G01V/11/00 |
| FR | 2479992 | 10/1981 | | G01V/3/12 |
| GB | 2155182 | 9/1985 | | |
| GB | 2155182 A | * 9/1985 | | |
| GB | 2256715 | 12/1992 | | |
| GB | 2301902 | 12/1996 | | |
| WO | WO 81/01617 | 6/1981 | | G01V/3/17 |
| WO | WO 96/06367 | 2/1996 | | G01V/3/12 |
| WO | WO98/28638 | 7/1998 | | |
| WO | WO 00/13037 | 3/2000 | | G01V/3/12 |
| WO | WO 00/13046 | 3/2000 | | G01V/3/12 |
| WO | WO 00/63718 | 10/2000 | | G01S/5/06 |
| WO | WO01/55749 | 8/2001 | | G01V/3/30 |

OTHER PUBLICATIONS

Ellingsrud et al., "How Electromagnetic Sounding Technique Could be Coming to Hydrocarbon E & P", *First Break Article*, Mar. 1, 2002.

(List continued on next page.)

*Primary Examiner*—N. Le
*Assistant Examiner*—Subhash Zaveri
(74) *Attorney, Agent, or Firm*—Patterson, Thuente, Skaar & Christensen, P.A.

(57) ABSTRACT

A system for investigating subterranean strata. An electromagnetic field is applied using a fixed dipole antenna transmitter and this is detected using a dipole antenna receiver. The receiver is moved from one location to another in dependence upon the strength of the detected signal.

18 Claims, 1 Drawing Sheet

U.S. PATENT DOCUMENTS

| | | | | |
|---|---|---|---|---|
| 4,760,340 | A | * 7/1988 | Denzau et al. | 324/348 |
| 4,835,474 | A | 5/1989 | Parra et al. | 324/363 |
| 5,025,218 | A | 6/1991 | Ramstedt | 324/334 |
| 5,043,667 | A | * 8/1991 | Schofield | 324/350 |
| 5,177,445 | A | 1/1993 | Cross | 324/637 |
| 5,192,952 | A | 3/1993 | Johler | 342/22 |
| 5,280,284 | A | 1/1994 | Johler | 324/22 |
| 5,373,443 | A | 12/1994 | Lee et al. | 364/420 |
| 5,400,030 | A | 3/1995 | Duren et al. | 342/22 |
| H1490 | H | 9/1995 | Thompson et al. | 367/15 |
| 5,486,764 | A | 1/1996 | Thompson et al. | 324/323 |
| H1524 | H | 4/1996 | Thompson et al. | 324/334 |
| H1561 | H | 7/1996 | Thompson | 367/188 |
| 5,563,513 | A | 10/1996 | Tasci et al. | 324/359 |
| 5,767,679 | A | 6/1998 | Schroder | 324/337 |
| 5,877,995 | A | 3/1999 | Thompson et al. | 367/14 |
| 6,002,357 | A | 12/1999 | Redfern et al. | 342/22 |
| 6,023,168 | A | 2/2000 | Minerbo | 324/373 |
| 6,188,221 | B1 | 2/2001 | Van de Kop et al. | 324/337 |
| 6,339,333 | B1 | 1/2002 | Kuo | 324/337 |

OTHER PUBLICATIONS

Eidesmo et al., "Sea Bed Logging (SBL), a new method for remote and direct identification of hydrocarbon filled layers in deepwater areas", *First Break Research Findings*, Mar. 1, 2002.

"EM Field of an Electric Dipole on the Surface of a Medium Containing a Thin Resistant Layer", *EM Field of An Electric Dipole*, 1983.

Kaufman et al., 1981 Annual Meeting Abstracts: Marine EM Prospecting System, Annual Meeting Abstracts.

Garg et al., "Synthetic Electric Sounding Surveys Over Known Oil Fields", *Synthetic Electric Sounding Surveys*, Nov. 1, 1984.

Yuan et al., "The Assessment of Marine Gas Hydrates Through Electrical Remote Sounding: Hydrate Without a BSR?", *Assessment of Marine Gas Hydrates*, Aug. 15, 2000.

Edwards, "On the Resource Evaluation of Marine Gas Hydrate Deposits Using Sea–Floor Transient Electric Dipole–Dipole Methods", *Resource Evaluation of Marine Gas Hydrate Deposits*, Jan. 1, 1997.

Chave, "Some Comments on Seabed Propagation of ULF/ELF Electromagnetic Fields", *Seabed Propagation of ULF/ELF EM Fields*, Sep. 1, 1990.

MacGregor et al., "Use of Marine Controlled–Source Electromagnetic Sounding for Sub–Basalt Exploration", *Use of Marine Controlled–Source EM Sounding*, Apr. 1, 2000.

MacGregor, "Marine Controlled Source Electromagnetic Sounding: Development of a Regularized Inversion for 2–Dimensional Resistivity Structures", *Marine Controlled Source EM Sounding*, Apr. 1, 1999.

MacGregor et al., "The RAMESSES Experiment—III. Controlled–Source Electromagnetic Sounding of the Reykjanes Ridge", *RAMESSES Experiment*, Jul. 8, 1998.

Sinah et al., "Magmatic Processes at Slow Spreading Ridges: Implications of the RAMESSES Experiment at 57° 45'N on the Mid–Atlantic Ridge," *Magmatic Processes*, Jun. 23, 1998.

Sinah et al., "Evidence for Accumulated Melt Beneath the Slow–Spreading Mid–Atlantic Ridge," *Evidence for Accumulated Melt*, Jan. 1, 1997.

GB Search Report—GB 0119246.7.

* cited by examiner

ELECTROMAGNETIC METHODS AND APPARATUS FOR DETERMINING THE CONTENT OF SUBTERRANEAN RESERVOIRS

TECHNICAL FIELD

The present invention relates to a method and apparatus for determining the location of submarine and subterranean reservoirs. The invention is particularly suitable for determining the boundaries of a reservoir which contains hydrocarbons and whose approximate location is known.

BACKGROUND OF THE INVENTION

Currently, the most widely used techniques for geological surveying, particularly in submarine situations, are seismic methods. These seismic techniques are capable of revealing the structure of the subterranean strata with some accuracy. However, a seismic survey can not provide the information in real time. It is necessary with seismic techniques to gather seismic information and then analyse the results before taking any further readings.

SUMMARY OF THE INVENTION

It is therefore an object of the invention to provide a system for locating the boundaries of a subterranean reservoir in real time.

It has been appreciated by the present applicants that while the seismic properties of hydrocarbon filled strata and water-filled strata do not differ significantly, their electromagnetic resistivities do differ. Thus, by using an electromagnetic surveying method, these differences can be exploited.

Electromagnetic surveying techniques in themselves are known. However, they are not widely used in practice. In general, the reservoirs of interest are about 1 km or more below the seabed. In order to carry out electromagnetic surveying as a stand alone technique in these conditions, with any reasonable degree of resolution, short wavelengths are normally necessary. Unfortunately, such short wavelengths suffer from very high attenuation in a conductive medium as water filled strata. Long wavelengths do normally not provide adequate resolution. For these reasons, seismic techniques have been preferred.

However, while longer wavelengths applied by electromagnetic techniques cannot provide sufficient information to provide an accurate indication of the boundaries of the various strata, if the geological structure is already known, they can be used to determine the nature of a particular identified formation, if the possibilities for the nature of that formation have significantly differing electric characteristics. The resolution is not particularly important and so longer wavelengths which do not suffer from excessive attenuation can be employed.

The resistivity of seawater is about 0.3 ohm-m and that of the overburden beneath the seabed would typically be from 0.3 to 4 ohm-m, for example about 2 ohm-m. However, the resistivity of an H/C reservoir is likely to be about 20–300 ohm-m. Typically, therefore, the resistivity of a hydrocarbon-bearing formation will be 20 to 300 times greater than that of a water-bearing formation. This large difference can be exploited using the techniques of the present invention.

The electrical resistivity of a hydrocarbon reservoir normally is far higher than the surrounding material (overburden and underburden). EM-waves attenuate more rapidly, and travel slower inside a low resistivity medium, compared to a high resistivity medium. Consequently, hydrocarbon reservoir will attenuate EM-waves less, compared to a lower resistivity overburden. Furthermore, the EM-wave speed will be higher inside the reservoir.

A refracted EM wave behaves differently, depending on the nature of the stratum in which it is propagated. In particular, the propagation losses in hydrocarbon stratum are much lower than in a water-bearing stratum while the speed of propagation is much higher. Thus, when an hydrocarbon-bearing reservoir is present, and an EM field is applied, a strong and rapidly propagated refracted wave can be detected.

Thus, an electric dipole transmitter antenna on or close to the sea floor induces electromagnetic EM fields and currents in the sea water and in the subsurface strata. In the sea water, the EM-fields are strongly attenuated due to the high conductivity in the saline environment, whereas the subsurface strata with less conductivity has less attenuation. If the frequency is low enough (in the order of 1 Hz), the EM-energy is able to penetrate deep into the subsurface, and deeply buried geological layers having higher electrical resistivity than the overburden (as e.g. a hydrocarbon filled reservoir) will affect the EM-waves. Depending on the angle of incidence and state of polarisation, an EM wave incident upon a high resistive layer may excite a ducted (guided) wave mode in the layer. The ducted mode is propagated laterally along the layer and leaks energy back to the overburden and receivers positioned on the sea floor. In the present application, such a wave mode is referred to as a "refracted wave". When the hydrocarbon filled layer ends, the wave guide also ends and the refracted wave dies out. This edge effect is diagnostic for the reservoir boundaries.

The distance between the EM source and a receiver is referred to as the offset. Due to the fact that a refracted wave in a hydrocarbon-bearing formation will be less attenuated than a direct wave in seawater (or in the overburden), for any given H/C bearing formation, there will be a critical offset at which the refracted wave and the direct wave will have the same magnitude. This may typically be about two to three times greater than the shortest distance from the source (or receiver to the H/C bearing formation). Thus, when the offset is greater than the critical offset, the EM waves that are refracted into, and guided through the reservoir, will pay a major contribution to the received signal. The received signal will be of greater magnitude and arrive earlier (i.e. have smaller phase) compared to the case where there is no HC reservoir. Due to the critical angle, the receivers are rather sensitive to edge effects and the resolution will be far better than one wave length. The boundaries can therefore be identified with quite high accuracy.

When using time domain pulses, the signals through the overburden and the refracted waves in the reservoir will arrive at different times. This effect might be used to identify the extent of a reservoir. However, pulses suffer from strong dispersion in the conductive medium.

If the offset between the transmitter and receiver is significantly greater than three times the depth of the reservoir from the seabed (i.e. the thickness of the overburden), it will be appreciated that the attenuation of the refracted wave will often be less than that of direct wave and any reflected wave. The reason for this is the fact that the path of the refracted wave will be effectively distance from the transmitter down to the reservoir i.e. the thickness of the overburden, plus the offset along the reservoir, plus the distance from the reservoir up to the receivers i.e. once again the thickness of the overburden.

According to one aspect of the present invention, there is provided, a method for locating the boundary of a hydrocarbon-containing reservoir in subterranean strata, which comprises: deploying an electromagnetic transmitter; deploying an electromagnetic receiver; applying an electromagnetic (EM) field to the strata using the transmitter; detecting the EM wave field response using the receiver; analysing the response to determine the presence or absence of a hydrocarbon-containing reservoir; moving the receiver to another location; and repeating the procedure; in which method, the path taken by the receiver in moving from location to location is determined by the signal characteristics of previously detected EM wave field responses. When nearing the reservoir boundary, the edge effects, being a drop in detected magnitudes, will be identified. By measuring in different directions, the reservoir is delineated.

BRIEF DESCRIPTION OF THE DRAWINGS

The invention may be carried into practice in various ways and one embodiment will now be described with reference to the accompanying drawings in which.

DETAILED DESCRIPTION OF THE DRAWINGS

Figure 1:
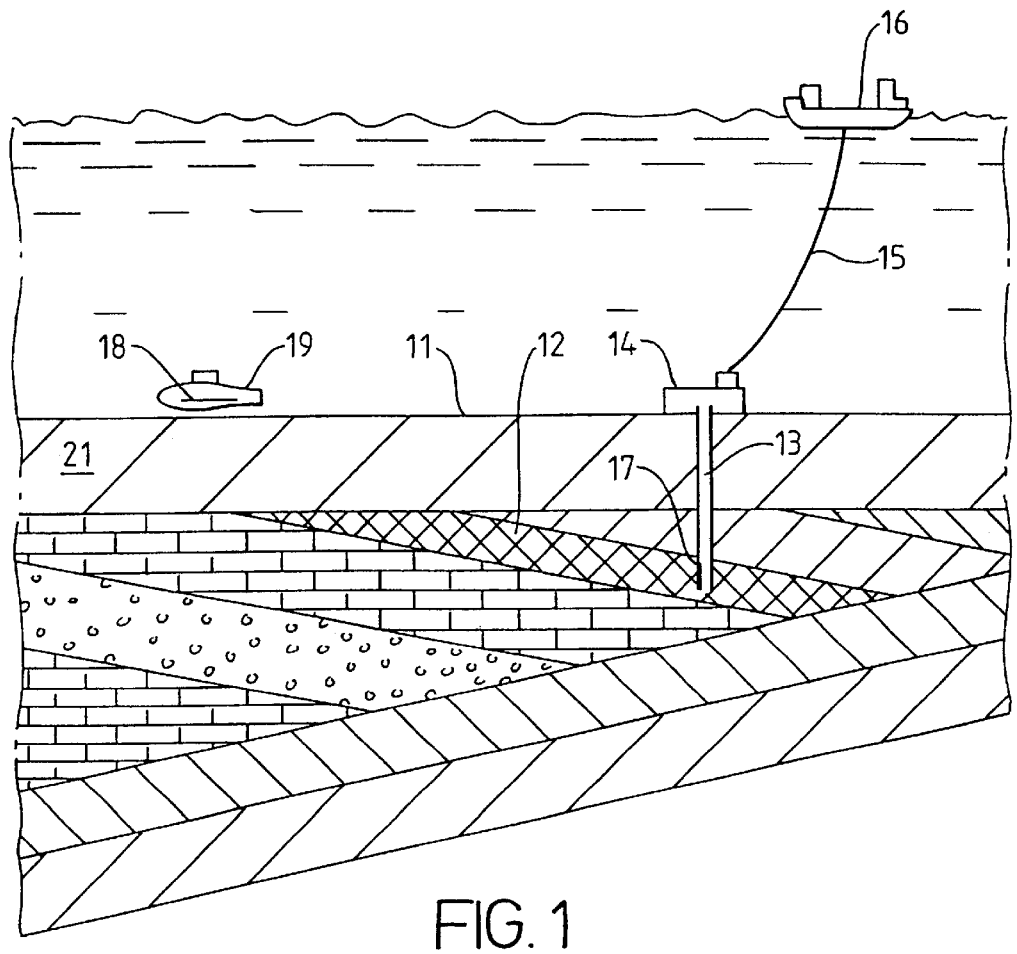
FIG. 1 is a schematic representation of a situation in which measurements are taken.

Preferably, the transmitter and/or receiver is an electric dipole antenna, but could also be magnetic coils. Preferably, a component representing a refracted wave is sought in the wave field response, in order to indicate the presence of a hydrocarbon-containing reservoir. Preferably, the strength of the wave field response is used to determine the path taken by the receiver. More preferably, the strength of the refracted wave response is used to determine the path taken by the receiver.

The polarization of the source transmission will determine how much energy is transmitted into the oil-bearing layer in the direction of the receiver. A dipole antenna is therefore the selected transmitter. In general, it is preferable to adopt a dipole with a large effective length. The transmitter dipole may therefore be 100 to 1000 meters in length and may be towed in two orthogonal directions. The receiver dipole optimum length is determined by the thickness of the overburden.

The technique is applicable in exploring land-based subterranean reservoirs but is especially applicable to submarine, in particular sub-sea, subterranean reservoirs. Preferably the field is applied using one fixed transmitter located on the earth's surface, and the detection is carried out by one movable receiver located on the earth's surface. In a preferred application, the transmitter and receiver are located on or close to the seabed or the bed of some other area of water.

The transmitted field may be pulsed, however, a coherent continuous wave optionally with stepped frequencies is preferred. It may be transmitted continuously for a significant period of time, during which the transmitter should preferably be stationary (although it could be moving slowly), and the transmission stable. Depending on the reservoir depth, the field may be transmitted for a period of time from 3 seconds to 60 minutes, preferably from 10 seconds to 5 minutes, for example about 1 minute. The receivers may also be arranged to detect a direct wave as well as the refracted wave from the reservoir, and the analysis may include extracting phase and amplitude data of the refracted wave from corresponding data from the direct wave.

Preferably, the receiver constantly detects the signal and adjusts its position constantly in response to the signal. Preferably, the receiver is arranged to follow a path in which the signal characteristics oscillates in value, thereby defining the boundary of the reservoir. Thus, the receiver may be arranged to move in such a way that it seeks out the changes in the detected wave field response that will occur as it repeatedly crosses the boundary of the hydrocarbon-containing reservoir.

Preferably, the wavelength of the transmission should be in the range $$0.1s \leq \lambda \leq 5s;$$

where $\lambda$ is the wavelength of the transmission through the overburden and s is the distance from the seabed to the reservoir. More preferably $\lambda$ is from about 0.5s to 2s. The transmission frequency may be from 0.01 Hz to 1 kHz, preferably from 0.1 to 20 Hz, for example 1 Hz.

Preferably, the distance between the transmitter and a receiver should be in the range $$0.5\lambda \leq L \leq 10\lambda;$$

where $\lambda$ is the wavelength of the transmission through the overburden and L is the distance between the transmitter and the first receiver.

It will be appreciated that the present invention may be used to determine the position and extent of a particular stratum, and may also be used to detect changes in these parameters over a period of time.

In a preferred arrangement, the transmitter is located in a well. In the case of an open hole well (one with no metal lining between the hole and the reservoir), the transmitter may be lowered as a tool into well fluid of suitable conductivity. This has the advantage of there being no potentially dangerous equipment in the well.

Alternatively, where there is a well casing, the casing itself can be used as the transmitter. In order to define a suitable length of the casing as a dipole antenna, isolating material can be built in to the casing at suitable positions. In this case, the power supply is lowered into the well and clamped to the inside of the casing. This can be applied to other parts of the well than the reservoir zone in order to study an oil/water interface; the transmitter can be in, above or below the reservoir zone.

The present invention is also concerned with studying reservoirs over time in order to monitor changes in their boundaries. These time lapse studies can be carried out in various ways.

According to one technique, a transmitter and a number of receivers, preferably both in the form of electric dipole antenna are buried beneath the sea floor. The signals can be collected by fibre optic or other cables.

In an alternative system, several transmitters may be buried beneath the sea floor and connected to a power supply unit which may be common to all the sources. There may be a single receiver or several receivers which can be deployed on the sea bed. The receiver antennae can simply be dropped and allowed to lie in position. The data can be collected by ROV. The antennae can, of course, be recovered and repositioned.

Benchmarks, for example in the form of liquid blocks, can be dropped in order to maintain a consistency in position if the receiver antennae and/or the transmitter antennae are to be located in the same position at different times.

An alternative form of benchmarking would be to use existing well bores. Either the transmitter can be located in the well bore or, indeed, the receiver. This may be preferably in certain instances since antennae may corrode if they are left in a position for long periods of time and are subject to the effects of sea water. In such cases, water tight connections and corrosion resistant metals should be used. In order to optimise the measures taken, sea water parameters such as depth, saliently and temperature, should be investigated.

The time lapse studies can, of course, be carried out in both deep and shallow water applications because any refracted airwave will be removed by subtraction.

FIG. 1 shows subterranean strata beneath a seabed 11 including an hydrocarbon bearing reservoir 12. A well bore 13 extends to the reservoir from a well head 14 attached by a line 15 to a surface vessel 16. A dipole antenna transmitter 17 is located in the well bore 13. A dipole antenna receiver 18 is located on a submarine 19 which is in contact with the surface vessel 16.

Figure 2:
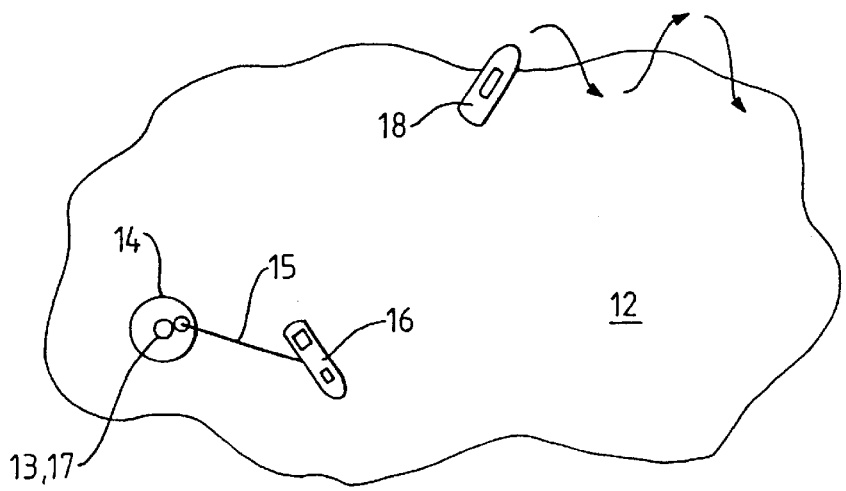
FIG. 2 is a plan view of the situation of FIG. 1.

The transmitter transmits a constant EM field which is ducted through the reservoir 12 and escapes through the overlying overburden 21. It is detected by the receiver 18. The detected wave is analysed and the submarine 19 moves until the detected wave response changes significantly. It then moves in a different direction until the wave response changes again. The submarine 18 then moves in a different direction once more until the wave response changes and the procedure is repeated. In this way, the submarine follows the boundary 22 of the reservoir as shown by the arrows 23 in FIG. 2.

What is claimed is:

1. A method for locating the boundary of a hydrocarbon-containing reservoir in subterranean strata, comprising:
   (a) deploying an electromagnetic transmitter;
   (b) deploying an electromagnetic receiver;
   (c) applying an electromagnetic (EM) field to the strata using the transmitter;
   (d) detecting the EM wave field response using the receiver;
   (e) analysing the response to determine the presence or absence of a hydrocarbon-containing reservoir;
   (f) moving the receiver to another location along a path, whereby the path taken by the receiver in moving from location to location is being determined by the signal characteristics of previously detected EM wave field responses; and
   (g) repeating the steps c–e.

2. A method as claimed in claim 1, in which the transmitter and/or receiver is a dipole antenna.

3. A method as claimed in claim 1, in which a component representing a refracted wave is sought in the wave field response, in order to indicate the presence of a hydrocarbon-containing reservoir.

4. A method as claimed in claim 1, in which strength of the wave field response is used to determine the path taken by the receiver.

5. A method as claimed in claim 4, in which the strength of the refracted wave response is used to determine the path taken by the receiver.

6. A method as claimed in claim 1, in which the field is transmitted for a period of time for 3 seconds to 60 minutes.

7. A method as claimed in claim 6, in which the transmission time is from 10 seconds to 5 minutes.

8. A method as claimed in claim 1, in which the transmitter transmits the field as a constant signal.

9. A method as claimed in claim 8, in which the receiver constantly detects the signal and adjusts its position constantly in response to the signal.

10. A method as claimed in claim 1, in which the receiver is arranged to follow a path in which the signal characteristics oscillates in value, thereby defining the boundary of the reservoir.

11. A method as claimed in claim 1, in which the receiver is located on a land vehicle or a submarine vessel.

12. A method as claimed in claim 1, in which the transmitter is deployed in a fixed location.

13. A method as claimed in claim 12, in which the transmitter is located in a well.

14. A method as claimed in claim 1, in which the wavelength of the transmission is given by the formula $$0.1s \leq \lambda \leq 10s$$

wherein $\lambda$ is the wavelength of the transmission through the overburden and s is the distance from the seabed to the reservoir.

15. A method as claimed in claim 1, in which the predetermined offset between the transmitter and a receiver is given by the formula:

$$0.5\lambda \leq L \leq 10\lambda;$$

where $\lambda$ is the wavelength of the transmission through the overburden and L is the distance between the transmitter and the receiver.

16. A method as claimed in claim 1, in which the transmission frequency is from 0.01 Hz to 1 kHz.

17. A method as claimed in claim 16, in which the transmission frequency is from 0.1 to 20 Hz.

18. A method as claimed in claim 1, which includes suppressing the direct wave and/or any other known wave contribution that may disturb the measurements, thereby reducing the required dynamic range of the receiver and increasing the resolution of the refracted wave.

* * * * *

UNITED STATES PATENT AND TRADEMARK OFFICE
CERTIFICATE OF CORRECTION

PATENT NO. : 6,696,839 B2
DATED : February 24, 2004
INVENTOR(S) : Ellingsrud et al.

It is certified that error appears in the above-identified patent and that said Letters Patent is hereby corrected as shown below:

<u>Title page,</u>
Insert Item -- [30]  Foreign Application Priority Data
August 7, 2001 (GB)   0119246.7 --

Signed and Sealed this

Fifteenth Day of June, 2004

JON W. DUDAS
*Acting Director of the United States Patent and Trademark Office*